(12) United States Patent
Mossoba et al.

(10) Patent No.: US 11,520,556 B2
(45) Date of Patent: Dec. 6, 2022

(54) APPLICATION REPLICATION PLATFORM

(71) Applicant: Capital One Services, LLC, McLean, VA (US)

(72) Inventors: Michael Mossoba, Arlington, VA (US); Abdelkadar M'Hamed Benkreira, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/305,263

(22) Filed: Jul. 2, 2021

(65) Prior Publication Data

US 2021/0326095 A1 Oct. 21, 2021

Related U.S. Application Data

(63) Continuation of application No. 16/850,207, filed on Apr. 16, 2020, now Pat. No. 11,055,054, which is a continuation of application No. 16/557,831, filed on Aug. 30, 2019, now Pat. No. 10,656,898.

(51) Int. Cl.
| | |
|---|---|
| *G06F 3/14* | (2006.01) |
| *G06F 21/62* | (2013.01) |
| *H04M 3/42* | (2006.01) |
| *G06F 8/61* | (2018.01) |
| *G06F 3/04842* | (2022.01) |

(52) U.S. Cl.
CPC .............. *G06F 3/1454* (2013.01); *G06F 8/61* (2013.01); *G06F 21/6245* (2013.01); *H04M 3/42161* (2013.01); *G06F 3/04842* (2013.01)

(58) Field of Classification Search
CPC .............................. G06F 3/04842; G06F 8/61
See application file for complete search history.

(56) References Cited

U.S. PATENT DOCUMENTS

| | | | |
|---|---|---|---|
| 10,656,898 B1 | 5/2020 | Mossoba | |
| 11,055,054 B2 | 7/2021 | Mossoba et al. | |
| 2005/0055337 A1* | 3/2005 | Bebo | G06F 16/24575 |
| 2009/0086957 A1* | 4/2009 | Kelley | H04M 7/0027 |
| | | | 379/265.09 |
| 2009/0209239 A1* | 8/2009 | Montesdeoca | H04L 67/34 |
| | | | 704/270.1 |
| 2012/0166970 A1* | 6/2012 | Gastaldi | H04L 12/4633 |
| | | | 715/753 |

(Continued)

*Primary Examiner* — Anil K Bhargava
(74) *Attorney, Agent, or Firm* — Harrity & Harrity, LLP

(57) ABSTRACT

A first device may receive a request to establish a replication session between a second device and a third device, where the replication session is associated with replicating user interactions with a user interface of an application across a first instance and a second instance of the application. The first device may receive, after receiving the request, information identifying a set of interactions by a user of the second device with a first user interface provided for display by the first instance. The first device may determine, from the information, a set of instructions related to causing an indication for the set of interactions to be provided for display on a second user interface provided for display for the second instance based on the information being received from the second device. The first device may provide, after determining the set of instructions, the set of instructions to the third device.

20 Claims, 9 Drawing Sheets

(56) References Cited

U.S. PATENT DOCUMENTS

| | | | |
|---|---|---|---|
| 2012/0239540 A1* | 9/2012 | Rogers, Jr. | G06F 21/6245 |
| | | | 726/26 |
| 2013/0331070 A1* | 12/2013 | Aldecoa | H04W 4/02 |
| | | | 455/414.1 |
| 2015/0046598 A1* | 2/2015 | Andrews | H04M 3/5232 |
| | | | 709/228 |
| 2015/0288672 A1* | 10/2015 | Patten | H04L 63/08 |
| | | | 726/28 |
| 2016/0171068 A1* | 6/2016 | Hardin | G06F 16/275 |
| | | | 707/610 |
| 2017/0185421 A1* | 6/2017 | Ketola | G06F 3/1462 |

* cited by examiner

APPLICATION REPLICATION PLATFORM

RELATED APPLICATIONS

This application is a continuation of U.S. patent application Ser. No. 16/850,207, filed Apr. 16, 2020 (now U.S. Pat. No. 11,055,054), which is a continuation of U.S. patent application Ser. No. 16/557,831, filed Aug. 30, 2019 (now U.S. Pat. No. 10,656,898), which are incorporated herein by reference in their entireties.

BACKGROUND

Customer support for software applications can include a range of customer services to assist customers in operating their user devices. For example, a user can be provided with step-by-step instructions by a customer support representative and/or with reference to a web page.

SUMMARY

According to some implementations, a method may include receiving, by a first device, a request to establish a replication session between a second device and a third device, wherein the replication session is associated with replicating user interactions with a user interface of an application across a first instance and a second instance of the application; receiving, by the first device and after receiving the request, information that identifies a set of interactions by a user of the second device with a first user interface provided for display by the first instance; determining, by the first device and from the information, a set of instructions related to causing an indication for the set of interactions to be provided for display on a second user interface provided for display for the second instance based on the information being received from the second device; and providing, by the first device and after determining the set of instructions, the set of instructions to the third device.

According to some implementations, a first device may include one or more memories; and one or more processors, communicatively coupled to the one or more memories, configured to: receive a request to establish a replication session between a second device and a third device, wherein the replication session is associated with replicating user interactions with a user interface of an application across a first instance and a second instance of the application, wherein the request identifies the second device or the third device; cause corresponding user interfaces to be provided for display for the first instance and the second instance after receiving the request; receive, after causing the corresponding user interfaces to be provided for display, information that identifies a set of interactions by a user of the second device with a first user interface, of the corresponding user interfaces, provided for display for the first instance; determine, from the information, a set of instructions related to causing an indication for the set of interactions to be provided for display on a second user interface, of the corresponding user interfaces, based on the information being received from the second device; and perform, after determining the set of instructions, one or more actions related to the first instance or the second instance, wherein the one or more actions include providing the set of instructions to the third device.

According to some implementations, a non-transitory computer-readable medium may store one or more instructions. The one or more instructions, when executed by one or more processors of a first device, may cause the one or more processors to: receive a request to establish a replication session between a second device and a third device, wherein the replication session is associated with replicating user interactions with a user interface of an application across a first instance and a second instance of the application; receive, after receiving the request, information that identifies a set of interactions by a user of the second device with a first user interface provided for display for the first instance; determine, from the information, a set of instructions related to causing an indication for the set of interactions to be provided for display on a second user interface based on the information being received from the second device; and provide, after determining the set of instructions, the set of instructions to the third device.

DETAILED DESCRIPTION

Figure 1A:
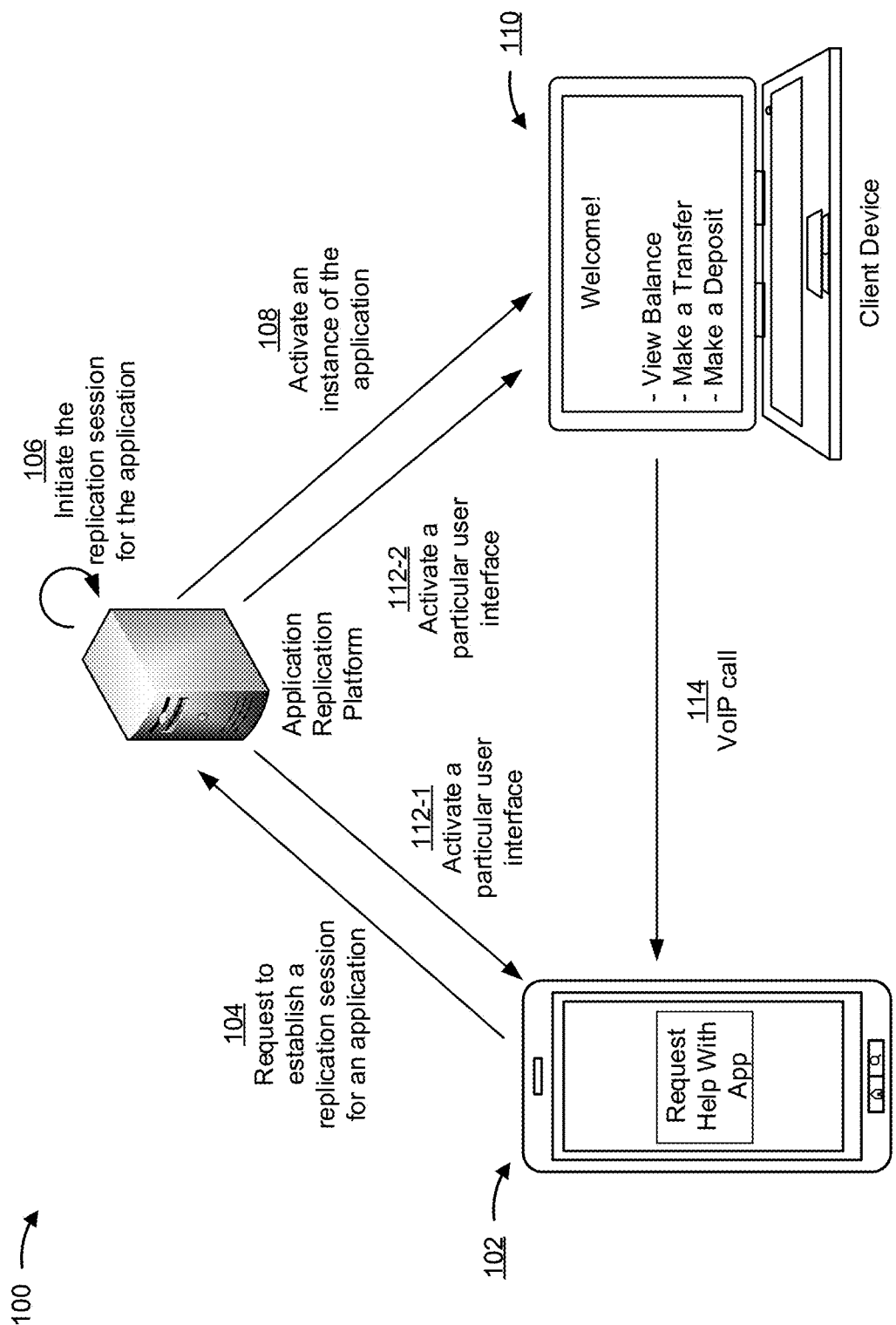
FIGS. 1A-1C are diagrams of an example implementation described herein.

The following detailed description of example implementations refers to the accompanying drawings. The same reference numbers in different drawings may identify the same or similar elements.

In some instances, a person initiates, using a communication device, a communication session (e.g., the person calls a telephone number, initiates a chat session, and/or the like) with a customer service representative and/or an interactive voice response (IVR) system of an organization. In some cases, the person interacts with the customer service representative and/or IVR system to obtain assistance and/or instructions for using an application (e.g., a mobile banking application, and/or the like) associated with the organization. However, the customer service representative and/or the IVR system may have difficulty providing the person with assistance using verbal communications. Furthermore, the person may be reluctant and/or refuse to authorize the customer service representative and/or the IVR system to remotely access a personal device and/or view a screen (e.g., via a screen sharing program) of the personal device for security and/or privacy reasons. For example, the person may not want to share sensitive information, such as personal information, an account balance, and/or the like, with the customer service representative and/or the IVR system.

This may increase a likelihood that the communication session will last longer to accommodate additional communication between the person and the customer service representative. This may also increase a likelihood that the person will terminate the communication session (e.g., hang up the call), which may cause the user to call the organization one or more additional times to try to avoid interacting with the same customer service representative. This may unnecessarily consume computing resources (e.g., processing resources, memory resources, power resources, communication resources, and/or the like) and/or network resources to support the additional communication and/or the person placing multiple calls. Moreover, the computing resources (e.g., processing resources, memory resources, power resources, communication resources, and/or the like) and/or network resources may be unnecessarily used to facilitate a call that will ultimately be terminated before the person accomplishes the goal of the call.

Some implementations described herein provide an application replication platform that receives a request to establish a replication session between a user device and a client device (e.g., a customer service computer, a help desk computer, and/or the like). The application replication platform may identify an application and/or a user interface being used on the user device and open a second instance of the same or a similar application on the client device. The application replication platform may translate interactions with the application and/or user interface on the user device into corresponding indicators and/or changes on the application on the client device, and vice versa.

For example, if the user selects a button on the user interface, the application replication platform may translate the selection into a highlight and/or a change in interfaces on the client device. The highlight and/or change in interfaces on the client device allows the operator of the client device (e.g., a customer service representative, and/or the like) to visually track what the user is doing on the application to quickly and easily identify the issue that the user may be having without screensharing or providing the client device with remote access to the user device.

In some implementations, the operator of the client device may select an item in a menu on a user interface, and the application replication platform may translate the selection into a highlight and/or a change in interfaces on the user device. The highlight and/or change in interfaces on the user device allows the operator of the client device to visually teach the user how to use the application without screensharing or providing the client device with remote access to the user device.

In this way, some implementations provide an application replication platform that conserves computing resources (e.g., processing resources, memory resources, power resources, communication resources, and/or the like) and/or network resources that would be consumed by the operator of the client device (e.g., a customer service representative, and/or the like) verbally instructing the user through use of the application. Additionally, or alternatively, the application replication platform conserves computing resources (e.g., processing resources, memory resources, power resources, communication resources, and/or the like) and/or network resources by facilitating shorter calls, fewer calls, and/or the like to the help desk.

Some implementations described herein provide an application replication platform that receives a request to establish a replication session between a user device and an IVR system. The application replication platform may receive, from the user device, interactions of the user with an application and/or a user interface being used on the user device. The application replication platform may translate those interactions into information compatible with the IVR system, which may process the information to determine if the user is correctly interacting with the application and/or the user interface. The IVR system may provide audio instructions and/or corrections to the user. The application replication platform may receive, from the IVR system, instructions to cause indicators (e.g., highlights and/or changes in interfaces) to be displayed on the user device in conjunction with the provision of audio instructions and/or corrections to the user.

In this way, some implementations provide an application replication platform that conserves computing resources (e.g., processing resources, memory resources, power resources, communication resources, and/or the like) and/or network resources that would be consumed by the IVR system verbally instructing the user through use of the application. In some implementations, the application replication platform conserves computing resources (e.g., processing resources, memory resources, power resources, communication resources, and/or the like) and/or network resources by facilitating shorter calls, fewer calls, and/or the like to the help desk.

Figure 1B:
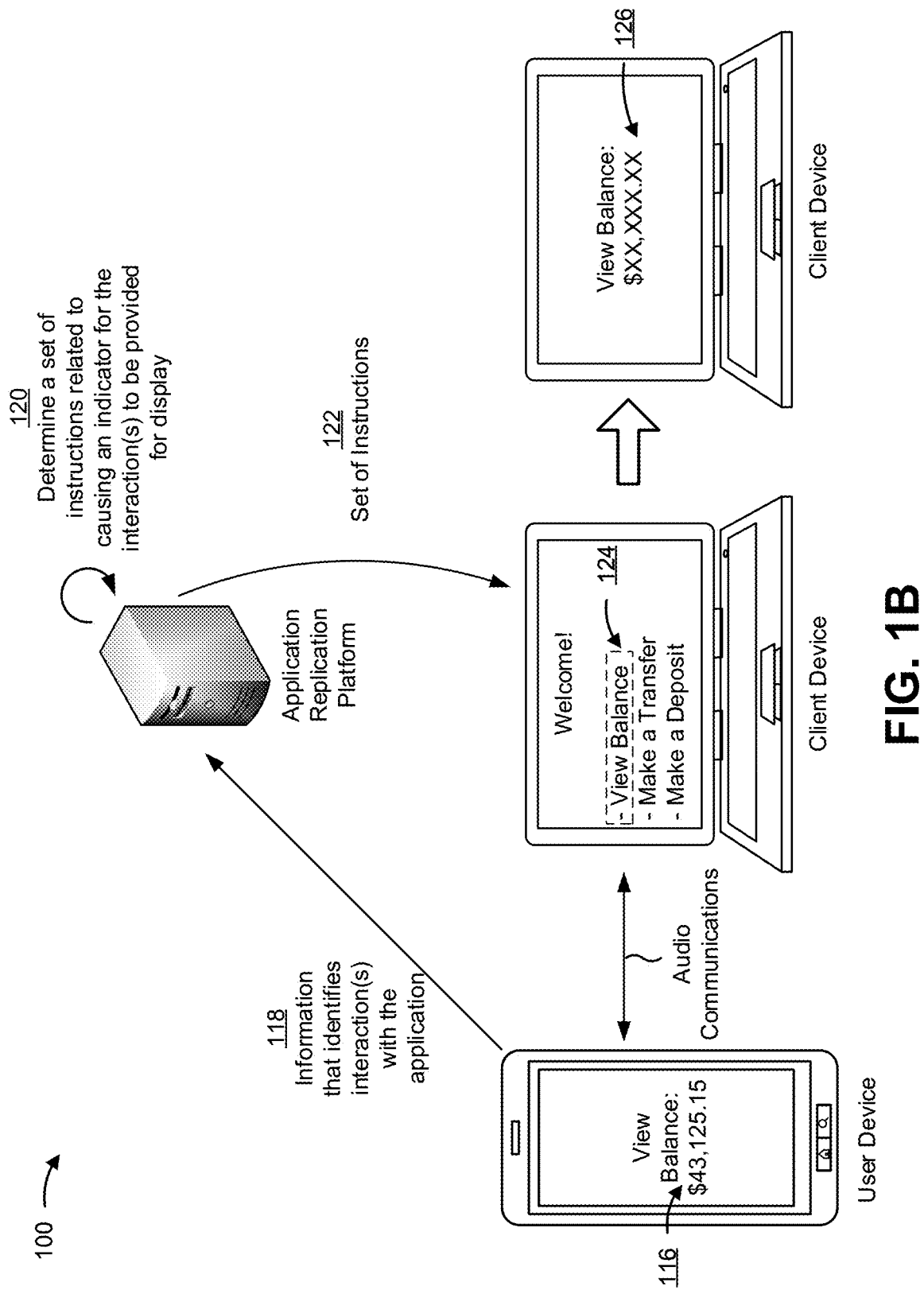
Figure 1C:
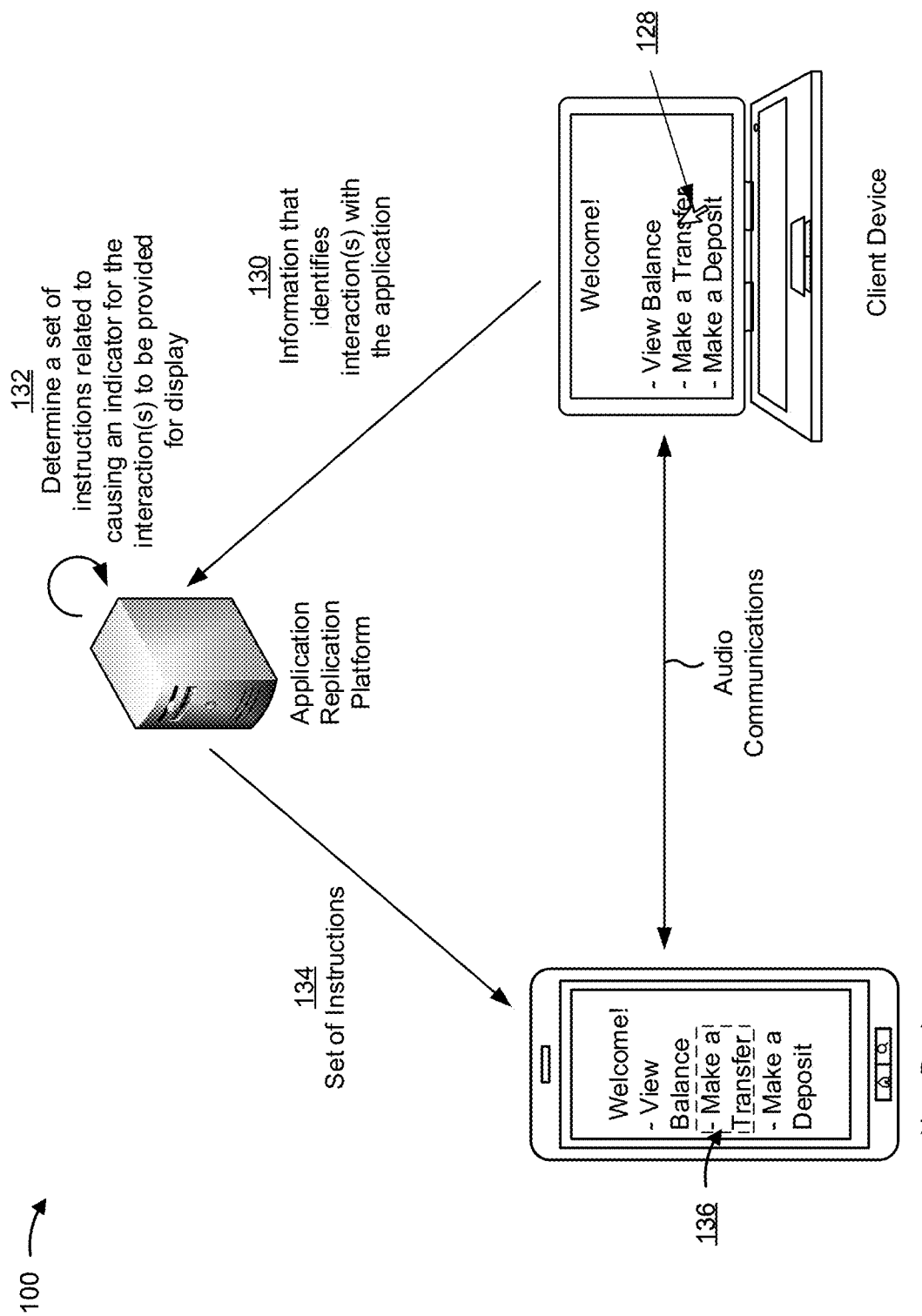

FIGS. 1A-1C are diagrams of one or more example implementations 100 described herein. For example, as shown in FIGS. 1A-1C, example implementation(s) 100 includes a user device, an application replication platform, and a client device. As described herein, the application replication platform may be associated with a financial institution (e.g., a bank or a credit card issuer). In some implementations, the application replication platform may be associated with an organization, other than a financial institution, that is associated with an application capable of executing on a user device.

In some implementations, a user may initiate a phone call or an online chat session (e.g., using the user device, such as a smartphone, a tablet, a personal computer, and/or the like) with the client device (e.g., associated with a customer support center) of a customer service representative (CSR) of an organization (e.g., a financial institution) to request information and/or assistance. The CSR may ask if the user has an application (e.g., a mobile banking application, and/or the like) installed on the user device. In some implementations, the client device, operated by the CSR, may determine whether the application is installed on the user device based on information provided to the client device (e.g., a phone number of the user, an identity or account identifier of the user, and/or the like). If the application is not installed on the user device, the client device may provide, to the user device (e.g., via email, text message, and/or the like), a link to download the application. The user device may download and install the application using the link.

As shown in FIG. 1A, and by reference number 102, the user may open the application on the user device, and the user device may provide a prompt to the user to request help. For example, rather than initiating a phone call or an online chat session with a CSR as described above, the user may need assistance using the application, and the user device may display a prompt for the user to request help.

As shown in FIG. 1A, and by reference number 104, the user device may provide, to the application replication platform, a request to establish a replication session for the application (e.g., after receiving input from the user requesting help). The request may include information identifying the user device, the user, the application, characteristics of the application, and/or the like.

In some implementations, if the user initiated a phone call or online chat session with the CSR, the client device may provide, to the application replication platform, a request to establish a replication session for the application between the user device and the client device (e.g., based on information provided by the user and/or the user device to the CSR and/or the client device). The request may include information identifying the client device, the user device, the user, the application, characteristics of the application, and/or the like.

In some implementations, the user may initiate a phone call with an interactive voice response (IVR) system to request information and/or assistance. Based on information provided by the user and/or the user device to the IVR system, the IVR system may provide, to the application replication platform, a request to establish a replication session between the user device and a client device operated by a CSR, and the IVR system may transfer the call to the CSR.

As shown in FIG. 1A, and by reference number 106, the application replication platform may initiate the replication session for the application between the user device and the client device. In some implementations, the application replication platform may initiate the replication session for the application by performing one or more actions to establish a first instance of the application on the user device and a second instance of the application on the client device.

For example, the application replication platform may determine that the application is not installed on the user device (e.g., because the CSR and/or the IVR system provided the request to establish the replication session, and/or the like). In such circumstances, the application replication platform may transmit, to the user device, a link to download the application (e.g., via email, text message, and/or the like). In this case, the user device may download and install the application using the link.

Additionally, or alternatively, if the application is not open on the user device when the application replication platform initiates the replication session (e.g., because the user closed the application, because the user never opened the application (e.g., because the CSR and/or the IVR system provided the request to establish the replication session), and/or the like), the application replication platform may send instructions to the user device to open an instance of the application. In some implementations, the application replication platform may receive, from the user device, one or more indications that the user device has downloaded, installed, and/or opened an instance of the application.

As shown in FIG. 1A, and by reference number 108, the application replication platform may provide, to the client device, instructions to activate an instance of the application. Additionally, or alternatively, the application replication platform may determine that the application is not installed on the client device, and may transmit, to the client device, a link to download the application (e.g., via email, text message, and/or the like). In this case, the client device may download and install the application using the link.

In some implementations, the application replication platform may identify one or more characteristics of the instance of the application (e.g., version of the application, operating system on which the application is running, and/or the like) on the user device. Based on the characteristics, the application replication platform may identify an instance of the application to be opened on the client device, and may provide, to the client device, instructions to activate the identified instance of the application.

For example, the application replication platform may provide, to the client device, instructions to activate an instance of the application running on the same operating system as the instance of the application running on the user device. Activating an instance of the application on the client device based on the characteristics of the instance of the application on the user device may improve communication between the user and the CSR and the ability of the client device and/or the CSR to resolve the user inquiry as compared to only audio-based communication (e.g., a phone call), thereby conserving computing resources (e.g., processing resources, memory resources, power resources, communication resources, and/or the like) and/or network resources that would be consumed by potential miscommunications.

As shown in FIG. 1A, and by reference number 110, the client device may receive the instructions from the application replication platform and open an instance of the application. In some implementations, if the application is not installed on the client device, the client device may access a data structure and install the application. In some implementations, the application replication platform may receive, from the client device, one or more indications that the client device has downloaded, installed, and/or opened an instance of the application.

As shown in FIG. 1A, and by reference numbers 112-1 and 112-2, the application replication platform may provide, to the user device, instructions to activate a particular user interface and, to the client device, instructions to activate a particular user interface. In some implementations, the application replication platform may provide, to the client device, instructions to activate a user interface based on the user interface being displayed on the user device. For example, the application replication platform may provide instructions to the client device to activate a user interface corresponding to the user interface already being displayed on the user device to replicate the display of the user device on the client device.

In some implementations, the application replication platform may provide, to the user device, instructions to activate a user interface based on the user interface being displayed on the client device. For example, the application replication platform may provide instructions to the user device to activate a user interface corresponding to the user interface already being displayed on the client device to replicate the display of the client device on the user device.

In some implementations, the application replication platform may provide, to the user device and/or the client device, instructions to activate a default user interface. For example, the application replication platform may provide, to the user device and/or the client device, instructions to activate a default user interface at the beginning of the replication session.

As shown in FIG. 1A, and by reference number 114, the client device may initiate a phone call (e.g., a voice-over-internet-protocol (VoIP) call, and/or the like) with the user device. For example, if the user device has not already initiated a phone call with the CSR (e.g., because the IVR system provided the request to establish the replication session, because the user provided the request to establish the replication session via the application without calling customer service, and/or the like), the client device may initiate a phone call with the user device. Establishing audio-based communication in conjunction with the replication session may improve communication between the user and the CSR and the ability of the client device and/or the CSR to resolve the user inquiry as compared to only communication via the replication session, thereby conserving computing resources (e.g., processing resources, memory resources, power resources, communication resources, and/or the like) and/or network resources that would be consumed by potential miscommunications.

As shown in FIG. 1B, and by reference number 116, the user device may receive input from the user interacting with the user interface. For example, the user device may receive a user selection (e.g., via input on a touchscreen, and/or the like) on the user interface to view a balance (e.g., of an account, and/or the like), and the user device may display the balance.

As shown in FIG. 1B, and by reference number 118, the user device provides, to the application replication platform, information that identifies the interaction with the application. For example, the user device may provide information identifying the option on the user interface selected by the user, information identifying a location of user interaction with the user interface, information identifying the response of the application to the user interaction, information including a recording of the user interaction with the user interface, the response of the application to the user interaction, and/or the like.

In some implementations, the application replication platform may receive the information identifying the interaction with the application. For example, the application replication platform may receive the information identifying the user interactions via a Web Socket between the user device and the application replication platform.

After receiving the information identifying the interaction, the application replication platform may process the information. For example, the application replication platform may process the information to determine whether the information and/or a subset of the information contains sensitive information (e.g., an account balance, an address, text input by the user, a transaction history, a name of the user, a phone number, and/or the like.)

As described herein, the application replication platform may use one or more artificial intelligence techniques, such as machine learning, deep learning, and/or the like to determine whether a subset of the information identifying the interaction with the application contains sensitive information (e.g., an account balance, an address, text input by the user, a transaction history, a name of the user, a phone number, and/or the like).

In some implementations, the application replication platform may parse natural language descriptions of historical information identifying interactions with the application and historical determinations of whether subsets of the information contain sensitive information. For example, the application replication platform may obtain data identifying, in natural language, a description of information identifying an interaction (e.g., an option selected by the user on a user interface, text input by the user, an account balance displayed in response to the interaction, a displayed address, a displayed transaction history, a displayed name of the user, a displayed phone number, and/or the like) and may parse the data to identify the subsets of information in the historical information, and/or the like.

In some implementations, the application replication platform may determine a characteristic of a subset of information based on natural language processing of the historical information and historical determinations of whether subsets of the information contain sensitive information, which may include a description of the subset of information. For example, based on a description of a subset of information being determined to contain sensitive information, the application replication platform may use natural language processing to determine that a characteristic of the subset of information is that the subset of information is associated with sensitive information. Similarly, based on a description of a subset of information being described as not containing sensitive information, the application replication platform may use natural language processing to determine that a characteristic of the subset of information is that the subset of information is not associated with sensitive information, and/or the like. In this case, the application replication platform may determine that a natural language text corresponds to a characteristic based on data relating to other subsets of information, data identifying characteristics of subsets of information, and/or the like.

In this way, the application replication platform may identify subsets of information associated with sensitive information, as described herein. Based on applying a rigorous and automated process associated with determining whether subsets of the information identifying interactions with the application contain sensitive information, the application replication platform enables recognition and/or identification of thousands or millions of data items for thousands or millions subsets of information, thereby increasing an accuracy and consistency of determining whether subsets of the information identifying interactions with the application contain sensitive information relative to requiring computing resources to be allocated for hundreds or thousands of technicians to manually determine whether subsets of the information identifying interactions with the application contain sensitive information based on the thousands or millions of data items.

In some implementations, the application replication platform may determine whether a subset of the information identifying interactions with the application contains sensitive information, as described herein. For example, using historical information identifying interactions with the application and historical determinations of whether subsets of the information contain sensitive information, the application replication platform may determine whether a subset of the information contains sensitive information. In this case, the application replication platform may generate a model of sensitive information detection. For example, the application replication platform may train a model using historical information that includes a plurality of subsets of information, a plurality of determinations of whether subsets of the information contain sensitive information, and/or the like, to determine whether a subset of the information identifying the interaction with the application contains sensitive information. As an example, the application replication platform may determine that past subsets are associated with a threshold probability of containing sensitive information. In some implementations, the application replication platform may use a scoring system (e.g., with relatively high scores and/or relatively low scores) to identify and/or classify subsets of information identifying subsets of information as being associated with one another. In this case, the application replication platform may determine that a relatively high score (e.g., as being likely to be identified as containing sensitive information) is to be assigned to a subset of information that is determined to be the same or similar to a previously identified subset of information previously determined to contain sensitive information. In contrast, the application replication platform may determine that a relatively low score (e.g., as being unlikely to be identified) is to be assigned to a subset of information that is determined to be different than a previously identified subset of information previously determined to contain sensitive information.

In some implementations, the application replication platform may perform a data preprocessing operation when generating the model of sensitive information detection. For example, the application replication platform may preprocess data (e.g., historical information identifying interactions with the application, historical determinations of whether subsets of the information contain sensitive information, and/or the like) to remove non-ASCII characters, white spaces, and/or the like. In this way, the application replication platform may organize thousands, millions, or billions of data entries for machine learning and model generation.

In some implementations, the application replication platform may perform a training operation when generating the model of sensitive information detection. For example, the application replication platform may portion data of the historical information and data of the historical determinations into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the application replication platform may preprocess and/or perform dimensionality reduction to reduce the data of the historical information and data of the historical determinations to a minimum feature set. In some implementations, the application replication platform may train the model of sensitive information detection on this minimum feature set, thereby reducing processing to train the machine learning model, and may apply a classification technique, to the minimum feature set.

In some implementations, the application replication platform may use a classification technique, such as a logistic regression classification technique, a random forest classification technique, a gradient boosting machine learning (GBM) technique, and/or the like, to determine a categorical outcome (e.g., that a subset of information contains sensitive information, that a subset of information does not sensitive information, and/or the like). Additionally, or alternatively, the application replication platform may use a naïve Bayesian classifier technique. In this case, the application replication platform may perform binary recursive partitioning to split the data of the minimum feature set into partitions and/or branches and use the partitions and/or branches to perform predictions (e.g., that a subset of information does or does not contain sensitive information). Based on using recursive partitioning, the application replication platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the application replication platform may use a support vector machine (SVM) classifier technique to generate a non-linear boundary between data items in the training set. In this case, the non-linear boundary is used to classify test data (e.g., data relating subsets of information) into a particular class (e.g., a class indicating that the subset of information contains sensitive information, a class indicating that the subset of information does not contain sensitive information, and/or the like).

Additionally, or alternatively, where the test data includes image data, video data, and/or the like, the application replication platform may use a computer vision technique, such as a convolutional neural network technique to assist in classifying test data (e.g., data relating a characteristic of a subset of information) into a particular class (e.g., a class indicating that the subset of information contains sensitive information, a class indicating that the subset of information does not contain sensitive information, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the application replication platform may train the model of sensitive information detection using a supervised training procedure that includes receiving input to the model from a subject matter expert, which may reduce an amount of time, an amount of processing resources, and/or the like to train the model of sensitive information detection relative to an unsupervised training procedure. In some implementations, the application replication platform may use one or more other model training techniques, such as a neural network technique, a latent semantic indexing technique, and/or the like. For example, the application replication platform may perform an artificial neural network processing technique (e.g., using a two-layer feedforward neural network architecture, a three-layer feedforward neural network architecture, and/or the like) to perform pattern recognition with regard to patterns of whether subsets of information identifying interactions with the application described using different semantic descriptions can be used to determine whether a subset of information contains sensitive information or not. In this case, using the artificial neural network processing technique may improve an accuracy of a model (e.g., the sensitive information detection model) generated by the application replication platform by being more robust to noisy, imprecise, or incomplete data, and by enabling the application replication platform to detect patterns and/or trends undetectable to human analysts or systems using less complex techniques.

As an example, the application replication platform may use a supervised multi-label classification technique to train the model. For example, as a first step, the application replication platform may map parameters to a subset of information identifying interactions with the application. In this case, the parameters may be characterized as containing sensitive information or not containing sensitive information based on characteristics of the parameters (e.g., whether a characteristic of a parameter is similar or associated with a parameter of the subset of information) and an analysis of the parameters (e.g., by a technician, thereby reducing processing relative to the application replication platform being required to analyze each activity). As a second step, the application replication platform may determine classifier chains, whereby labels of target variables may be correlated (e.g., in this example, labels may be parameters and correlation may refer to a common characteristic of a subset of information. In this case, the application replication platform may use an output of a first label as an input for a second label (as well as one or more input features, which may be other data relating to the subsets of information), and may determine a likelihood that a particular parameter that includes a set of characteristics (some of which are associated with a particular subset of information and some of which are not associated with the particular subset of information) are associated with the particular subset of information based on a similarity to other parameters that include similar characteristics. In this way, the application replication platform transforms classification from a multi-label-classification problem to multiple single-classification problems, thereby reducing processing utilization. As a third step, the application replication platform may determine a Hamming Loss Metric relating to an accuracy of a label in performing a classification by using the validation set of the data. For example, an accuracy with which a weighting applied to each parameter or characteristic and whether each parameter or characteristic is associated with a subset of information or not, results in a correct prediction of whether the subset of information contains sensitive information or not, thereby accounting for differing amounts to which association of any one parameter or characteristic influences the determination that the subset of information contains sensitive information or not. As a fourth step, the application replication platform may finalize the model based on labels that satisfy a threshold accuracy associated with the Hamming Loss Metric and may use the model for subsequent prediction of whether parameters of a subset of information are to result in a determination that the subset of information does or does not contain sensitive information.

As another example, the application replication platform may determine, using a linear regression technique, that a threshold percentage of parameters, in a set of parameters, do not determine whether a subset of information does or does not contain sensitive information, and may determine that those parameters are to receive relatively low association scores. In contrast, the application replication platform may determine that another threshold percentage of parameters do determine whether a subset of information does or does not contain sensitive information and may assign a relatively high association score to those parameters. Based on the parameters determining whether a subset of information does or does not contain sensitive information, the application replication platform may generate the model of sensitive information detection and may use the model of sensitive information detection for analyzing new parameters, and/or the like) that the application replication platform identifies.

In some implementations, a different device, such as a server device, may generate and train the model. The different device may send the model for use by the application replication platform. The different device may update and send (e.g., on a scheduled basis, on an on-demand basis, on a triggered basis, on a periodic basis, and/or the like) the model to the application replication platform.

Accordingly, the application replication platform may use any number of artificial intelligence techniques, machine learning techniques, deep learning techniques, and/or the like to determine whether a subset of the information identifying the interaction with the application contains sensitive information.

In some implementations, the application replication platform may determine whether a subset of the information identifying the interaction with the application contains sensitive information based on stored information. For example, the stored information may identify the subsets of information that contain sensitive information based on information regarding the application, such as which interactions result in the display of sensitive information, which portions of user interfaces display sensitive information, and/or the like. In this way, the application replication platform, based on the stored information regarding the application, may determine whether a subset of the information identifying the interaction with the application contains sensitive information, which may conserve computing resources (e.g., processing resources, memory resources, power resources, communication resources, and/or the like) and/or network resources.

As shown in FIG. 1B, and by reference number 120, the application replication platform may determine a set of instructions related to causing an indicator for the interaction to be provided for display on the client device. In some implementations, the application replication platform may access a mapping between user interface elements on the user interface displayed on the user device and user interface elements displayed on the client device and may determine the set of instructions based on the mapping. For example, the user device may display a user interface including a virtual button including the text "View Balance," and the client device may display a user interface including a list of items including an item for "View Balance." The application replication platform may access the mapping, which may map the virtual button including the text "View Balance" to the item for "View Balance," and determine the set of instructions based on the mapping.

As another example, the user device may have a touchscreen for receiving touch-based inputs, while the client device may be a personal computer (PC) without a touchscreen. In such circumstances, the instance of the application running on the user device may provide user interfaces designed for touch-based inputs, and the instance of the application running on the client device may provide user interfaces designed for mouse and/or keyboard-based inputs. Using the mapping, the application replication platform may map touch-based interactions with the user interface on the user device to mouse and/or keyboard-based interactions with the user interface on the client device. In this way, the application replication platform may use the mapping to account for differences between the instance of the application running on the user device and the instance of the application running on the client device.

As another example, the application replication platform may use a coordinate mapping system that maps interaction with the user interface on the user device to the user interface on the client device, and/or vice versa. For example, an interaction of a touch, on the user device, at a point X1, Y1 in the coordinate system of the user device may map to a selection at X2, Y2 in the coordinate system of the client device, and/or the like. Additionally, or alternatively, the application replication platform may use a coordinate mapping system that uses the coordinate system of the user device on the client device. For example, if the user device includes a 1,000-by-10,000-pixel display, the application replication platform may map interactions on the user device to a portion of the display of the client device that matches the 1,000-by-10,000-pixel display of the user device (e.g., to simplify translation of selections and/or interactions from the user device to the client device and vice versa, and/or the like).

In some implementations, the application replication platform may determine a first set of instructions for a first set of user interactions using a first application programming interface (API) and may determine a second set of instructions for a second set of user interactions using a second API that is different from the first API. For example, the application replication platform may determine a first set of instructions for the user inputting text using the first API, and may determine the second set of instructions for the user selecting a virtual button using the second API.

In some implementations, the application replication platform, using the model of sensitive information detection, may determine that a subset of the information identifying the interaction with the application contains sensitive information, and determine a set of instructions for the client device that includes displaying masked and/or modified characters in place of the sensitive information. For example, the masked and/or modified characters may include the letter "X" in place of digits of numbers, blurred characters, boxes (e.g., opaque boxes, colored boxes (e.g., black, red, white and/or the like), and/or the like) covering characters, and/or the like.

As shown in FIG. 1B, and by reference number 122, the application replication platform may provide, to the client device, the set of instructions. In some implementations, the application replication platform may provide the set of instructions to the client device via a Web Socket between the application replication platform and the client device. In some implementations, the Web Socket between the application replication platform and the client device is different than another Web Socket between the application replication platform and the user device via which the application replication platform received the information identifying the user interactions.

As shown in FIG. 1B, and by reference number 124, the client device may receive the set of instructions from the application replication platform, execute the instructions, and display a user interface similar to the user interface with which the user interacted and an indicator on the user interface indicative of a portion of the user interface with which the user interacted. As shown in FIG. 1B, the indicator may be a dashed box surrounding the portion of the user interface with which the user interacted. In some implementations, the indicator may be a highlighted portion of a user interface, an arrow pointing to the portion of the user interface with which the user interacted, a flashing portion of the user interface with which the user interacted, a pulsing portion of the user interface with which the user interacted, a circle and/or oval surrounding the portion of the user interface with which the user interacted, a graphical overlay (e.g., an image of a hand and/or finger, an image of a mouse cursor, and/or the like) demonstrating the manner in which the user interacted with the user interface (e.g., a graphical overlay moving on the display, and/or the like), an animation depicting entry of text into a text field, and/or the like.

As shown in FIG. 1B, and by reference number 126, the client device may display a response of the application to the interaction with the user interface. For example, the client device may display an account balance in response to interaction with the item for "View Balance." As shown in FIG. 1B, the client device may display masked and/or modified characters in place of sensitive information, such as an account balance, based on the application replication platform determining that the information is sensitive as described above. By masking and/or modifying the sensitive information, the client device and/or application replication platform may prevent the CSR from seeing the sensitive information, thereby maintaining the confidentiality of the sensitive information.

In some implementations, if the CSR needs to view sensitive information (e.g., to assist the user, and/or the like), the client device may provide a communication (e.g., a push notification, a text message, and/or the like) to the user device (e.g., directly to the user device, via the application replication platform, and/or the like) requesting authorization to display the sensitive information to the CSR. The client device may receive authorization from the user, display the sensitive information, and document the authorization from the user.

As shown in FIG. 1C, and by reference number 128, the client device may receive an interaction with a user interface of the application from the CSR. For example, the interaction may include the CSR using a mouse-based input to select an item from a list in a user interface of the application displayed by the client device.

As shown in FIG. 1C, and by reference number 130, the client device may provide, to the application replication platform, information that identifies the interaction with the application. For example, the client device may provide information identifying the item on the user interface selected by the CSR, information identifying a location of CSR interaction with the user interface, information identifying the response of the application to the CSR interaction, the response of the application, and/or the like.

In some implementations, the client device may provide, to the application replication platform, a captured recording of the indicator displayed on the client user interface and/or information identifying the interactions of the CSR with the client user interface. The application replication platform may perform an analysis of the recording and/or multiple recordings, and perform one or more actions based on a result of the analysis. For example, the application replication platform may analyze the recording and/or multiple recordings to assess the performance of the CSR (e.g., by identifying mistakes made by the CSR, by identifying a new solution created by the CSR for a problem, by identifying ways that the CSR could be more efficient, and/or the like). Based on the result of the analysis, the application replication platform may generate and transmit a score, a report, a recommendation, an employment contract (e.g., if the CSR was interviewing for a job), and/or the like to a manager, a human resources database, a printer, and/or the like.

In some implementations, the application replication platform may analyze the recording and/or multiple recordings and use the result of the analysis to update a machine learning model trained to make recommendations to the CSR for resolving user help requests. For example, the application replication platform may use one or more artificial intelligence techniques, such as machine learning, deep learning, and/or the like to provide recommendations to the CSR for resolving requests for help from users, based on the results of the analysis, as described with respect to the model of sensitive information detection.

In some implementations, the application replication platform may receive the information identifying the interaction of the CSR with the application. For example, the application replication platform may receive the information identifying the user interactions via the Web Socket between the client device and the application replication platform. After receiving the information identifying the interaction of the CSR with the application, the application replication platform may process the information.

As shown in FIG. 1C, and by reference number 132, the application replication platform may determine a set of instructions related to causing an indicator for the interaction of the CSR to be provided for display on the user device. In some implementations, the application replication platform may access a mapping between user interface elements on the user interface displayed on the client device and user interface elements displayed on the user device and may determine the set of instructions based on the mapping. The mapping may be the same as or different from the mapping between user interface elements on the user interface displayed on the user device and user interface elements displayed on the client device described with respect to reference number 120 in FIG. 1B.

In some implementations, the application replication platform may determine a first set of instructions for a first set of CSR interactions using a first application programming interface (API) and may determine a second set of instructions for a second set of CSR interactions using a second API that is different from the first API. For example, the application replication platform may determine a first set of instructions for the CSR typing text (e.g., via a keyboard, and/or the like) into a text box using the first API and may determine the second set of instructions for the CSR selecting (e.g., by clicking a mouse, and/or the like) an item using the second API.

As shown in FIG. 1C, and by reference number 134, the application replication platform may provide, to the user device, the set of instructions. In some implementations, the application replication platform may provide the set of instructions to the user device via the Web Socket between the application replication platform and the user device.

As shown in FIG. 1C, and by reference number 136, the user device may receive the set of instructions, execute the instructions, and display a user interface similar to the user interface with which the CSR interacted and an indicator on the user interface indicative of a portion of the user interface with which the CSR interacted. As shown in FIG. 1C, the indicator may be a dashed box surrounding the portion of the user interface with which the CSR interacted. In some implementations, the indicator may be a highlighted portion of a user interface, an arrow pointing to the portion of the user interface with which the CSR interacted, a flashing portion of the user interface with which the CSR interacted, a pulsing portion of the user interface with which the CSR interacted, a circle and/or oval surrounding the portion of the user interface with which the CSR interacted, a graphical overlay (e.g., an image of a hand and/or finger, an image of a mouse cursor, and/or the like) demonstrating the manner in which the CSR interacted with the user interface (e.g., a graphical overlay moving on the display, and/or the like), an animation depicting entry of text into a text field, and/or the like.

In some implementations, the application replication platform may monitor for and/or receive additional information identifying additional interactions by the user and/or the CSR with user interfaces being displayed on the user device and/or client device. The application replication platform may determine, based on the additional information, one or more additional sets of instructions to be provided to the user device and/or client device, and provide the one or more additional sets of instructions to the user device and/or client device.

Accordingly, the application replication platform may identify the interactions by the user with the user device for the CSR and identify the interactions by the CSR with the client device for the user, and, when coupled with the audio communications, may permit the CSR to resolve the issue that the user was facing more efficiently than just using audio communications. Furthermore, the application replication platform may permit the CSR to resolve the issue without sharing sensitive information or allowing the CSR to remotely access the user device. In this way, the application replication platform conserves computing resources (e.g., processing resources, memory resources, power resources, communication resources, and/or the like) and/or network resources that would be consumed by the CSR verbally instructing the user through use of the application, by facilitating shorter calls, by facilitating fewer calls, and/or the like.

As indicated above, FIGS. 1A-1C are provided as one or more examples. Other examples may differ from what is described with regard to FIGS. 1A-1C.

Figure 2:
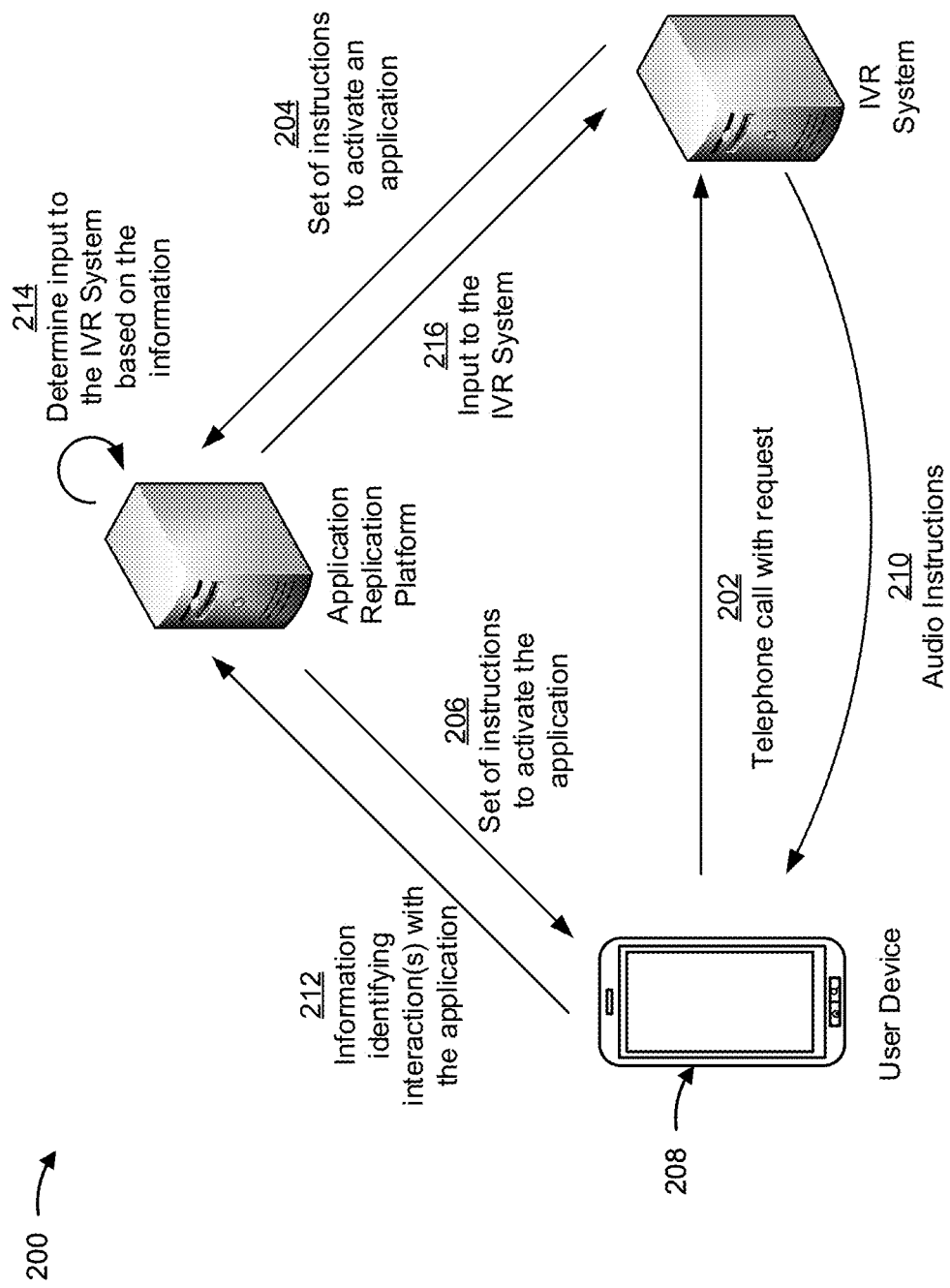
FIG. 2 is a diagram of an example implementation described herein.

FIG. 2 is a diagram of one or more example implementations 200 described herein. For example, as shown in FIG. 2, example implementation(s) 200 includes a user device, an application replication platform, and an IVR system. As described herein, the application replication platform may be associated with a financial institution (e.g., a bank or a credit card issuer). In some implementations, the application replication platform may be associated with an organization, other than a financial institution, that is associated with an application capable of executing on a user device.

As shown in FIG. 2, and by reference number 202, a user may initiate a telephone call (e.g., using the user device, such as a smartphone, a tablet, a personal computer, and/or the like) with the IVR system of an organization (e.g., a financial institution) to request information and/or assistance. Based on information provided by the user to the IVR system via the telephone call, the IVR system may determine that an application (e.g., a mobile banking application, and/or the like) can be used to assist the user and/or that the user needs assistance with the application.

In some implementations, the IVR system may ask if the user has the application installed on the user device. In some implementations, the IVR system may determine whether the application is installed on the user device based on information provided to the IVR system (e.g., a phone number of the user, an identity or account identifier of the user, and/or the like). If the application is not installed on the user device, the IVR system may provide, to the user device (e.g., via email, text message, and/or the like), a link to download the application. The user device may use the link to download and install the application.

As shown in FIG. 2, and by reference number 204, the IVR system may provide, to the application replication platform, a set of instructions to activate the application. In some implementations, the IVR system may provide, to the application replication platform, a set of instructions to activate the application that includes instructions to download the application (e.g., including a link to a download, and/or the like).

As shown in FIG. 2, and by reference number 206, the application replication platform provides, to the user device, a set of instructions to activate the application. In some implementations, rather than the IVR system providing a set of instructions to the application replication platform that includes instructions to download the application, the IVR system may provide a set of instructions to activate the application to the application replication platform, and the application replication platform may include instructions to download the application in the set of instructions sent to the user device. In other words, rather than the IVR providing the instructions to download the application, the application replication platform may provide the instructions to download the application. Thus, the IVR system may provide instructions to download the application directly to the user device (e.g., via email, text message, and/or the like) or to the user device through the application replication platform, and, in some implementations, the application replication platform may provide the instructions to download the application (e.g., with the instructions to activate the application).

In some implementations, the application replication platform may send instructions to the user device to open an instance of the application. In some implementations, the application replication platform may receive, from the user device, one or more indications that the user device has downloaded, installed, and/or opened an instance of the application.

As shown in FIG. 2, and by reference number 208, the user device may receive, from the application replication platform, the set of instructions and open the application. In some implementations, if the set of instructions includes instructions to download the application, the user device may download the application and open an instance of the application.

As shown in FIG. 2, and by reference number 210, the IVR system may provide audio instructions to the user for interacting with the application. For example, the IVR system may provide audio instructions to the user for downloading the application, opening the application, creating an account in the application, entering login information in the application, setting up a password for the application, adjusting settings of the application, accessing information in the application (e.g., account balances, statements, payment due dates, and/or the like), transferring funds from one account to another account in the application, and/or the like.

As shown in FIG. 2, and by reference number 212, the user device may provide, to the application replication platform, information identifying an interaction with the application. In some implementations, the user device may receive input from the user interacting with a displayed user interface, and the user device may provide information identifying the user input. For example, the user device may receive a user selection (e.g., via input on a touchscreen, and/or the like) on the user interface to view a balance (e.g., of an account, and/or the like), and the user device may provide, to the application replication platform, information identifying the user selection to view the balance. In some implementations, the user device may provide information identifying the option on the user interface selected by the user, information identifying a location of user interaction with the user interface, information identifying the response of the application to the user interaction, information including a recording of the user interaction with the user interface, the response of the application to the user interaction, and/or the like.

In some implementations, the application replication platform may receive the information identifying the interaction with the application. For example, the application replication platform may receive the information identifying the user interactions via a Web Socket between the user device and the application replication platform. After receiving the information identifying the user interactions, the application replication platform may process the information.

As shown in FIG. 2, and by reference number 214, the application replication platform may determine input to the IVR system based on the information. In some implementations, the application replication platform may generate data to be input to the IVR system based on the information. For example, the application replication platform may generate a spoken word description, a text description, an image of a selection made by the user interaction, a video recording of the user interaction, and/or the like based on the information identifying the interaction with the application, which the IVR system may be configured to receive and process.

As shown in FIG. 2, and by reference number 216, the application replication platform may provide the input to the IVR system. In some implementations, the IVR system may receive the input and process the input to determine information associated with the user interaction with the application. For example, the IVR system may process the input to determine how the user interacted with a displayed user interface (e.g., which menu item the user selected, which virtual button the user selected, the text the user entered into a text field, and/or the like).

In some implementations, the IVR system may process the input, determine how the user interacted with the application, and determine whether the user correctly followed the audio instructions provided to the user by the IVR system. For example, the IVR system may provide, to the user, an audio instruction to select "View balance" on a user interface. After the user interacts with the application, the user device may provide, to the application replication platform, information identifying the interaction. The application replication platform may determine input to the IVR system based on the information, and provide, to the IVR system, the input. The IVR system may process the input and determine that the user selected "Make a transfer" on the user interface, instead of "View balance." Based on the determination that the user selected an option inconsistent with the audio instructions, the IVR system may provide a second audio instruction (e.g., explaining that the user selected the incorrect option, instructing the user to navigate within the application back to the correct menu, and/or the like). If the IVR system determines that the user selected an option consistent with the audio instructions, the IVR system may provide another audio instruction (e.g., for interacting with the application, and/or the like).

In some implementations, the IVR system may provide, to the application replication platform, information that identifies an interaction with the application that is consistent with the audio instructions provided by the IVR system. For example, the IVR system may provide, to the user, an audio instruction to select "Make a deposit" on the user interface, and may provide, to the application replication platform, information identifying the selection of a virtual button for "Make a deposit" on the user interface.

The application replication platform may determine a set of instructions related to causing an indicator for the interaction to be provided for display on the user device. For example, the indicator may be a highlighted portion of a user interface, an arrow pointing to the portion of the user interface, a flashing portion of the user interface, a pulsing portion of the user interface, a circle and/or oval surrounding the portion of the user interface, a graphical overlay (e.g., an image of a hand and/or finger, an image of a mouse cursor, and/or the like) demonstrating the manner in which the user should interact with the user interface (e.g., a graphical overlay moving on the display, and/or the like), an animation depicting entry of text into a text field, and/or the like.

The application replication platform may provide, to the user device, the set of instructions. The user device may receive the set of instructions from the application replication platform, execute the instructions, and display the user interface and an indicator on the user interface indicative of a portion of the user interface consistent with the audio instructions. For example, if the IVR system provided an audio instruction to select "Make a deposit" on the user interface, the user device may display the user interface with the option for "Make a deposit" flashing or pulsing (e.g., to distinguish the option from other options on the user interface, and/or the like).

Using the audio instructions, the application replication platform identifying the interactions by the user with the user device for the IVR system, and the application replication platform providing visual indicators to support the audio instructions provided to the user by the IVR system, the IVR system may resolve the issue the user is facing more efficiently than may be achieved using only audio communications. Furthermore, such implementations may not require a CSR to assist the user. In this way, some implementations provide an application replication platform that conserves computing resources (e.g., processing resources, memory resources, power resources, communication resources, and/or the like) and/or network resources that would be consumed by the IVR system verbally instructing the user through use of the application, by facilitating shorter calls, by facilitating fewer calls, and/or the like to the help desk.

As indicated above, FIG. 2 is provided as one or more examples. Other examples may differ from what is described with regard to FIG. 2.

Figure 3:
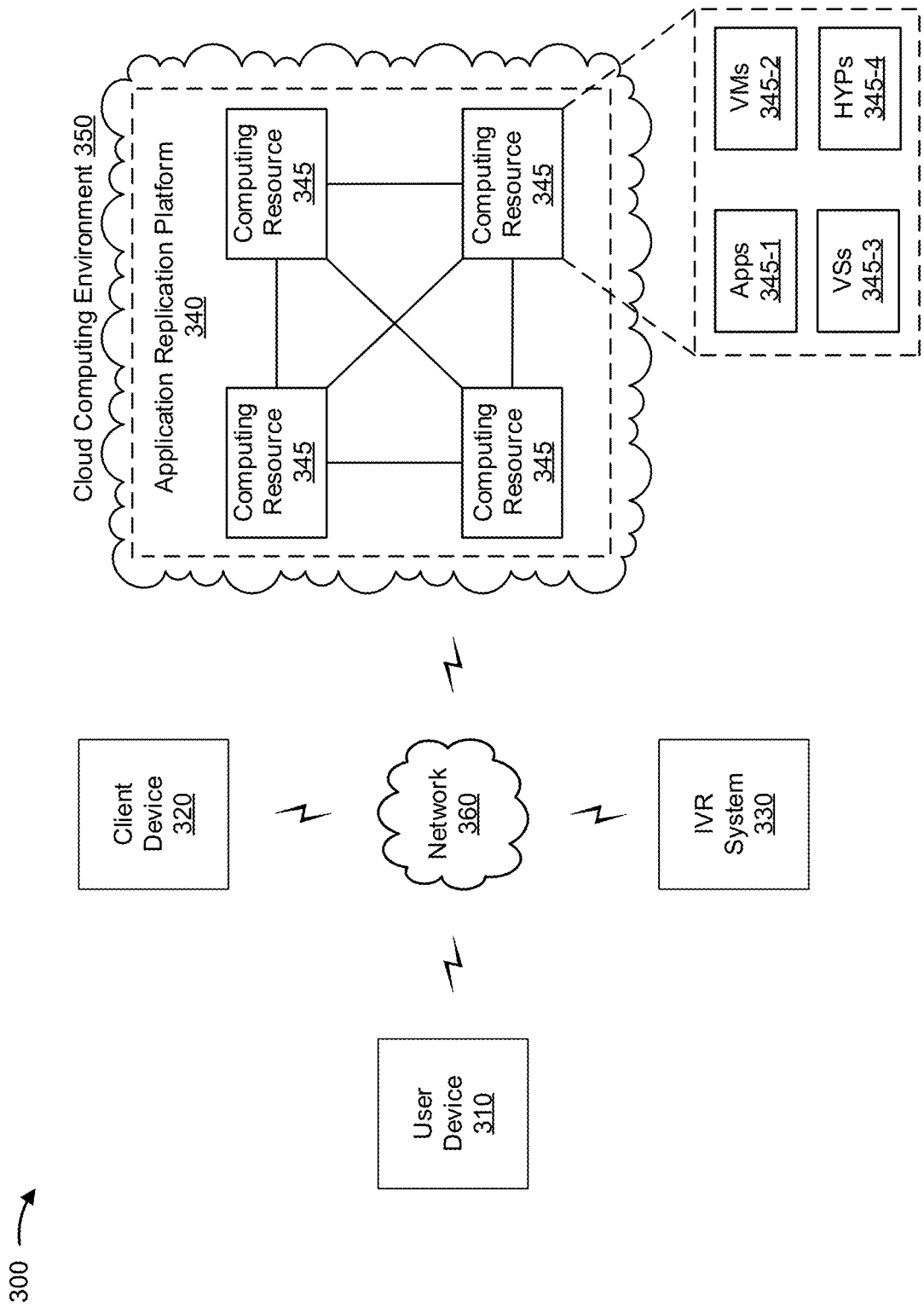
FIG. 3 is a diagram of an example environment in which systems and/or methods described herein may be implemented.

FIG. 3 is a diagram of an example environment 300 in which systems and/or methods, described herein, may be implemented. As shown in FIG. 3, environment 300 may include a user device 310, a client device 320, an IVR system 330, an application replication platform 340, a computing resource 345, a cloud computing environment 350, and a network 360. Devices of environment 300 may interconnect via wired connections, wireless connections, or a combination of wired and wireless connections.

User device 310 includes one or more devices capable of receiving, generating, storing, processing, and/or providing information associated with interactions with user interfaces of applications. For example, user device 310 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Client device 320 includes one or more devices capable of receiving, generating, storing, processing, and/or providing information associated with customer service requests, telephone calls, and interactions with user interfaces of applications. For example, user device 310 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

IVR system 330 includes one or more devices capable of performing interactive voice response functions. In some implementations, IVR system 330 may be a computing device, a server, a cloud computing device, and/or the like. In some implementations, a user using user device 310, a CSR using client device 320, and/or application replication platform 340 may interact, via one or more communication sessions, with IVR system 330 through the use of voice and dual-tone multi-frequency signaling (DTMF) tones.

Application replication platform 340 includes one or more computing resources assigned to receive, from user device 310, client device 320, and/or IVR system 330, one or more requests to establish a replication session, receive information identifying interactions with user interfaces, determine instructions to cause indications for the interactions to be displayed, provide the instructions, and/or the like. For example, application replication platform 340 may be a platform implemented by cloud computing environment 350 that may receive, from user device 310, client device 320, and/or IVR system 330, one or more requests to establish a replication session, receive information identifying interactions with user interfaces, determine instructions to cause indications for the interactions to be displayed, provide the instructions, and/or the like. In some implementations, application replication platform 340 is implemented by computing resources 345 of cloud computing environment 350.

Application replication platform 340 may include a server device or a group of server devices. In some implementations, application replication platform 340 may be hosted in cloud computing environment 350. Notably, while implementations described herein describe application replication platform 340 as being hosted in cloud computing environment 350, in some implementations, application replication platform 340 may be non-cloud-based or may be partially cloud-based.

Cloud computing environment 350 includes an environment that delivers computing as a service, whereby shared resources, services, and/or the like may be provided to user device 310, client device 320, and/or IVR system 330. Cloud computing environment 350 may provide computation, software, data access, storage, and/or other services that do not require end-user knowledge of a physical location and configuration of a system and/or a device that delivers the services. As shown, cloud computing environment 350 may include application replication platform 340 and computing resource 345.

Computing resource 345 includes one or more personal computers, workstation computers, server devices, or another type of computation and/or communication device. In some implementations, computing resource 345 may host application replication platform 340. The cloud resources may include compute instances executing in computing resource 345, storage devices provided in computing resource 345, data transfer devices provided by computing resource 345, and/or the like. In some implementations, computing resource 345 may communicate with other computing resources 345 via wired connections, wireless connections, or a combination of wired and wireless connections.

As further shown in FIG. 3, computing resource 345 may include a group of cloud resources, such as one or more applications ("APPs") 345-1, one or more virtual machines ("VMs") 345-2, virtualized storage ("VSs") 345-3, one or more hypervisors ("HYPs") 345-4, or the like.

Application 345-1 includes one or more software applications that may be provided to or accessed by, for example, user device 310, client device 320, and/or IVR system 330. Application 345-1 may eliminate a need to install and execute the software applications on user device 310, client device 320, and/or IVR system 330. For example, application 345-1 may include software associated with application replication platform 340 and/or any other software capable of being provided via cloud computing environment 350. In some implementations, one application 345-1 may send/receive information to/from one or more other applications 345-1, via virtual machine 345-2.

Virtual machine 345-2 includes a software implementation of a machine (e.g., a computer) that executes programs like a physical machine. Virtual machine 345-2 may be either a system virtual machine or a process virtual machine, depending upon use and degree of correspondence to any real machine by virtual machine 345-2. A system virtual machine may provide a complete system platform that supports execution of a complete operating system ("OS"). A process virtual machine may execute a single program and may support a single process. In some implementations, virtual machine 345-2 may execute on behalf of a user (e.g., user device 310, client device 320, and/or IVR system 330), and may manage infrastructure of cloud computing environment 350, such as data management, synchronization, or long-duration data transfers.

Virtualized storage 345-3 includes one or more storage systems and/or one or more devices that use virtualization techniques within the storage systems or devices of computing resource 345. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 345-4 provides hardware virtualization techniques that allow multiple operating systems (e.g., "guest operating systems") to execute concurrently on a host computer, such as computing resource 345. Hypervisor 345-4 may present a virtual operating platform to the guest operating systems and may manage the execution of the guest operating systems. Multiple instances of a variety of operating systems may share virtualized hardware resources.

Network 360 includes one or more wired and/or wireless networks. For example, network 360 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
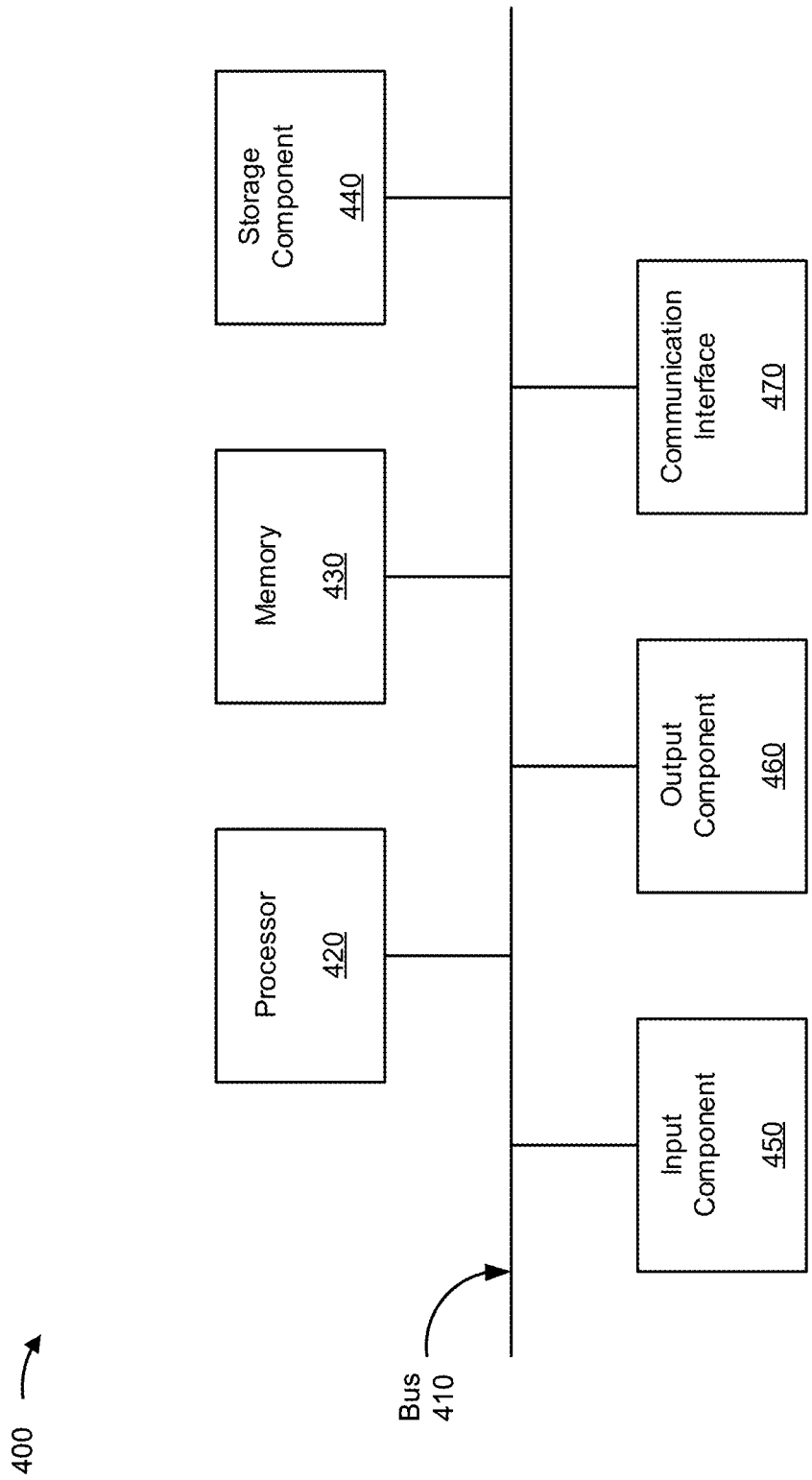
FIG. 4 is a diagram of example components of one or more devices of FIG. 3.

FIG. 4 is a diagram of example components of a device 400. Device 400 may correspond to user device 310, client device 320, IVR system 330, application replication platform 340, and/or computing resource 345. In some implementations, user device 310, client device 320, IVR system 330, application replication platform 340, and/or computing resource 345 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
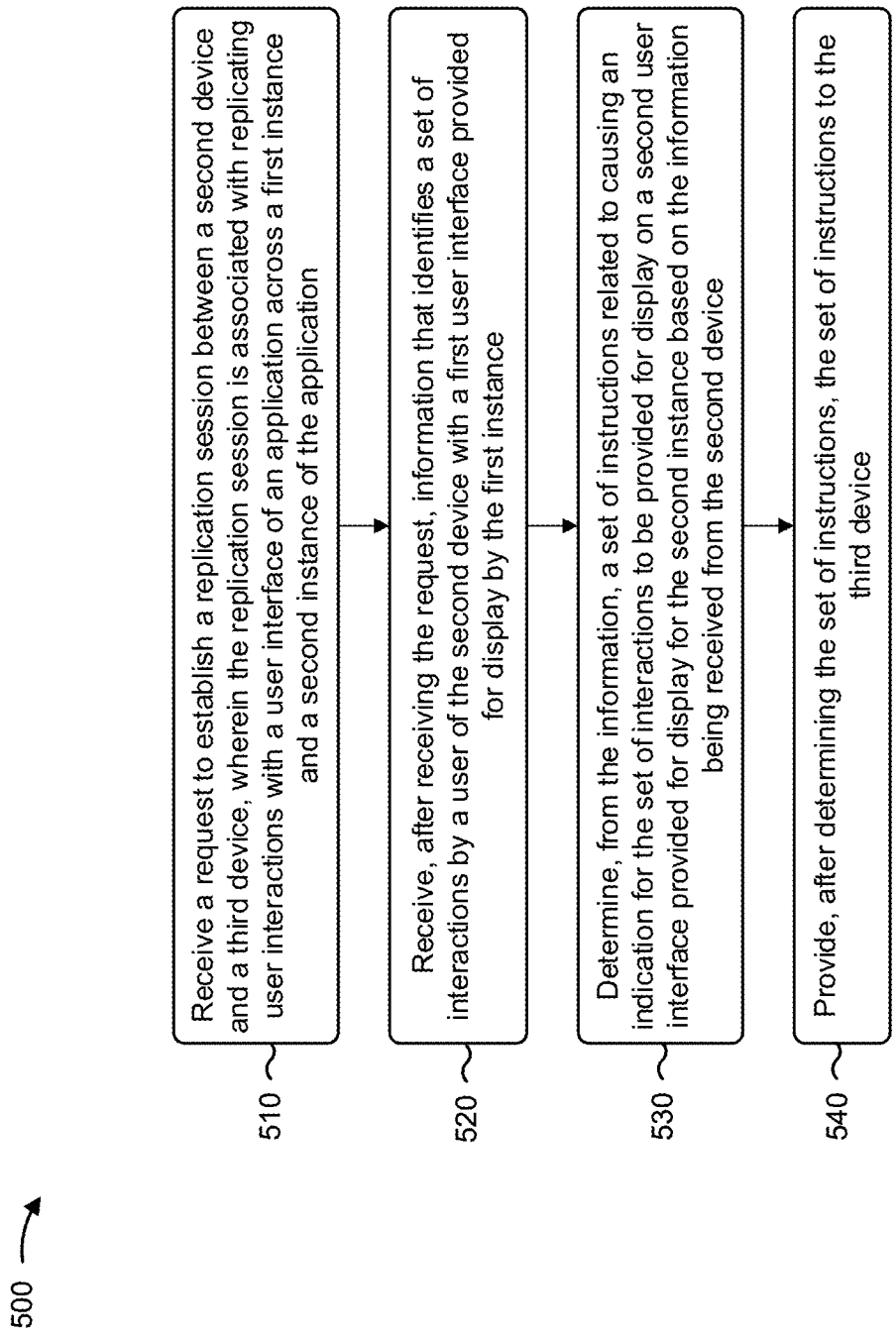
FIG. 5 is a flow chart of an example process for application replication.

FIG. 5 is a flow chart of an example process 500 for replicating user interactions with a user interface of an application across a first instance and a second instance of the application. In some implementations, one or more process blocks of FIG. 5 may be performed by a first device (e.g., application replication platform 340). In some implementations, one or more process blocks of FIG. 5 may be performed by another device or a group of devices separate from or including the first device, such as a user device (e.g., user device 310), a client device (e.g., client device 320), an IVR system (e.g., IVR system 330), and/or the like.

As shown in FIG. 5, process 500 may include receiving a request to establish a replication session between a second device and a third device wherein the replication session is associated with replicating user interactions with a user interface of an application across a first instance and a second instance of the application (block 510). For example, the first device (e.g., using computing resource 345, processor 420, memory 430, storage component 4340, input component 450, output component 460, communication interface 470 and/or the like) may receive a request to establish a replication session between a second device and a third device, as described above. In some implementations, the replication session is associated with replicating user interactions with a user interface of an application across a first instance and a second instance of the application.

As further shown in FIG. 5, process 500 may include receiving, after receiving the request, information that identifies a set of interactions by a user of the second device with a first user interface provided for display by the first instance (block 520). For example, the first device (e.g., using computing resource 345, processor 420, memory 430, storage component 4340, input component 450, output component 460, communication interface 470 and/or the like) may receive, after receiving the request, information that identifies a set of interactions by a user of the second device with a first user interface provided for display by the first instance, as described above.

As further shown in FIG. 5, process 500 may include determining, from the information, a set of instructions related to causing an indication for the set of interactions to be provided for display on a second user interface provided for display for the second instance based on the information being received from the second device (block 530). For example, the first device (e.g., using computing resource 345, processor 420, memory 430, storage component 4340, input component 450, output component 460, communication interface 470 and/or the like) may determine, from the information, a set of instructions related to causing an indication for the set of interactions to be provided for display on a second user interface provided for display for the second instance based on the information being received from the second device, as described above.

As further shown in FIG. 5, process 500 may include providing, after determining the set of instructions, the set of instructions to the third device (block 540). For example, the first device (e.g., using computing resource 345, processor 420, memory 430, storage component 4340, input component 450, output component 460, communication interface 470 and/or the like) may provide, after determining the set of instructions, the set of instructions to the third device, as described above.

Process 500 may include additional implementations, such as any single implementation or any combination of implementations described below and/or in connection with one or more other processes described elsewhere herein.

In a first implementation, receiving the request comprises receiving the request to establish the replication session between the second device and the third device from an interactive voice response (IVR) system.

In a second implementation, alone or in combination with the first implementation, determining the set of instructions comprises determining the set of instructions from the information that identifies the set of interactions using a first application programming interface (API) that is different than a second API used to determine another set of instructions to be provided to the second device.

In a third implementation, alone or in combination with one or more of the first and second implementations, receiving the information comprises receiving the information that identifies the set of interactions via a first Web Socket between a first device and the second device.

In a fourth implementation, alone or in combination with one or more of the first through third implementations, the set of instructions are to cause a visual indicator to be provided for display on the second user interface based on a selection of a user interface element on the first user interface, cause a change from the second user interface based on a corresponding change from the first user interface, or cause a set of masked characters to be provided for display on the second user interface based on input of text into the first user interface.

In a fifth implementation, alone or in combination with one or more of the first through fourth implementations, process 500 may include accessing, based on the application, a mapping between a first set of user interface elements of the first user interface and a second set of user interface elements of the second user interface, wherein the mapping is stored by a first device, and determining the set of instructions comprises determining, after accessing the mapping, the set of instructions based on the mapping.

In a sixth implementation, alone or in combination with one or more of the first through fifth implementations, process 500 may include sending another set of instructions to the second device to cause the first instance to be opened on the second device, or sending the other set of instructions to the third device to cause the second instance to be opened on the third device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
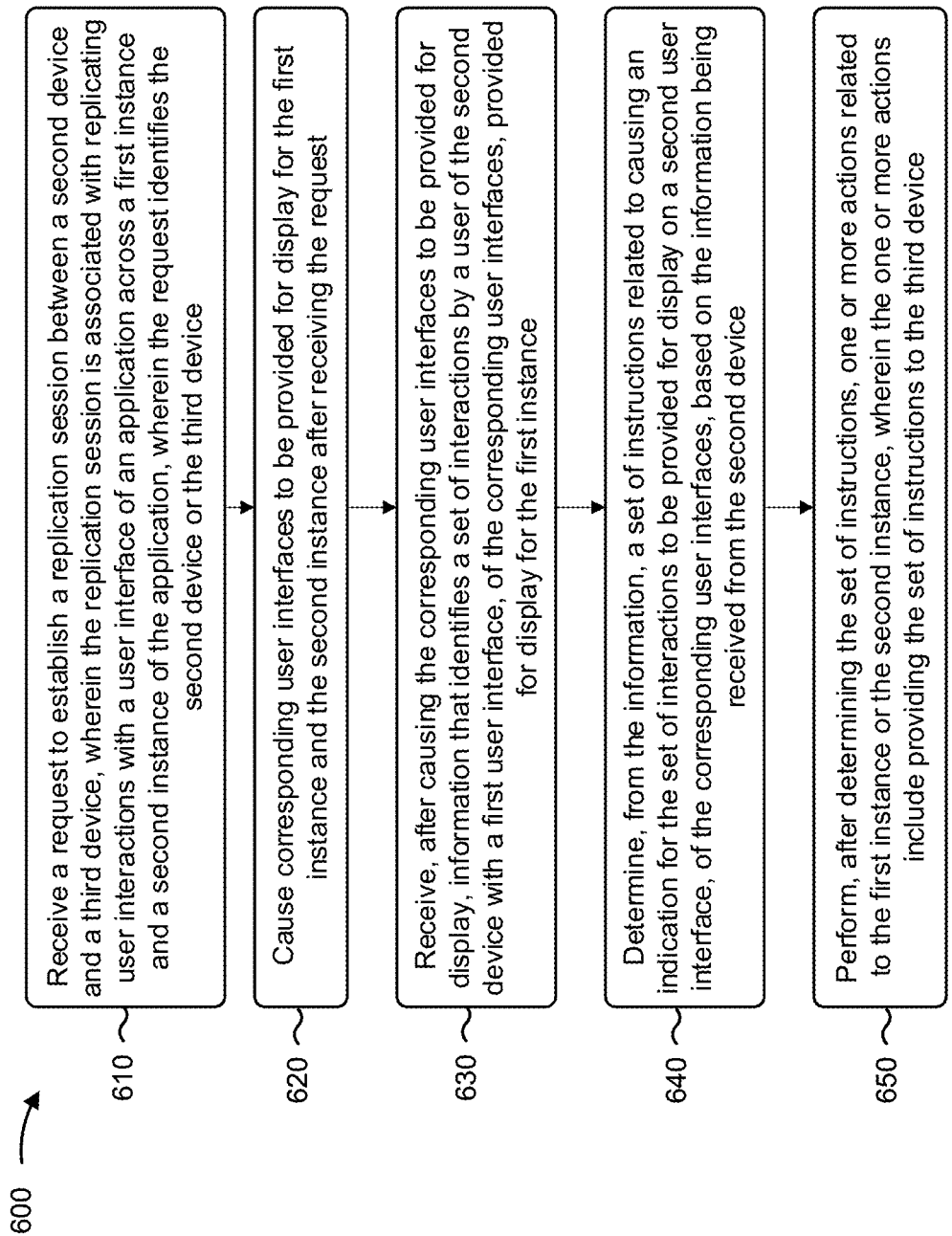
FIG. 6 is a flow chart of an example process for application replication.

FIG. 6 is a flow chart of an example process 600 for replicating user interactions with a user interface of an application across a first instance and a second instance of the application. In some implementations, one or more process blocks of FIG. 6 may be performed by a first device (e.g., application replication platform 340). In some implementations, one or more process blocks of FIG. 6 may be performed by another device or a group of devices separate from or including the first device, such as a user device (e.g., user device 310), a client device (e.g., client device 320), an IVR system (e.g., IVR system 330), and/or the like.

As shown in FIG. 6, process 600 may include receiving a request to establish a replication session between a second device and a third device wherein the replication session is associated with replicating user interactions with a user interface of an application across a first instance and a second instance of the application and wherein the request identifies the second device or the third device (block 610). For example, the first device (e.g., using computing resource 345, processor 420, memory 430, storage component4340, input component 450, output component 460, communication interface 470 and/or the like) may receive a request to establish a replication session between a second device and a third device, as described above. In some implementations, the replication session is associated with replicating user interactions with a user interface of an application across a first instance and a second instance of the application. In some implementations, the request identifies the second device or the third device.

As further shown in FIG. 6, process 600 may include causing corresponding user interfaces to be provided for display for the first instance and the second instance after receiving the request (block 620). For example, the first device (e.g., using computing resource 345, processor 420, memory 430, storage component4340, input component 450, output component 460, communication interface 470 and/or the like) may cause corresponding user interfaces to be provided for display for the first instance and the second instance after receiving the request, as described above.

As further shown in FIG. 6, process 600 may include receiving, after causing the corresponding user interfaces to be provided for display, information that identifies a set of interactions by a user of the second device with a first user interface, of the corresponding user interfaces, provided for display for the first instance (block 630). For example, the first device (e.g., using computing resource 345, processor 420, memory 430, storage component4340, input component 450, output component 460, communication interface 470 and/or the like) may receive, after causing the corresponding user interfaces to be provided for display, information that identifies a set of interactions by a user of the second device with a first user interface, of the corresponding user interfaces, provided for display for the first instance, as described above.

As further shown in FIG. 6, process 600 may include determining, from the information, a set of instructions related to causing an indication for the set of interactions to be provided for display on a second user interface, of the corresponding user interfaces, based on the information being received from the second device (block 640). For example, the first device (e.g., using computing resource 345, processor 420, memory 430, storage component4340, input component 450, output component 460, communication interface 470 and/or the like) may determine, from the information, a set of instructions related to causing an indication for the set of interactions to be provided for display on a second user interface, of the corresponding user interfaces, based on the information being received from the second device, as described above.

As further shown in FIG. 6, process 600 may include performing, after determining the set of instructions, one or more actions related to the first instance or the second instance, wherein the one or more actions include providing the set of instructions to the third device (block 650). For example, the first device (e.g., using computing resource 345, processor 420, memory 430, storage component4340, input component 450, output component 460, communication interface 470 and/or the like) may perform, after determining the set of instructions, one or more actions related to the first instance or the second instance, as described above. In some implementations, the one or more actions include providing the set of instructions to the third device.

Process 600 may include additional implementations, such as any single implementation or any combination of implementations described below and/or in connection with one or more other processes described elsewhere herein.

In a first implementation, process 600 may include, when causing the corresponding user interfaces to be provided for display, causing the first user interface to be provided for display on the second device based on the second user interface being provided for display on the third device, causing the second user interface to be provided for display on the third device based on the first user interface being provided for display on the second device, or causing a default user interface to be provided for display as the first user interface or as the second user interface.

In a second implementation, alone or in combination with the first implementation, process 600 may include monitoring for additional information that identifies additional sets of interactions with the first user interface after providing the set of instructions, determining, based on monitoring for the additional information, one or more additional sets of instructions to be provided to the third device from the additional information, and providing, after determining the one or more additional sets of instructions, the one or more additional sets of instructions to the third device.

In a third implementation, alone or in combination with one or more of the first and second implementations, process 600 may include initiating, based on the request, the replication session after receiving the request by establishing a first Web Socket connection between a first device and the second device and a second Web Socket connection between the first device and the third device, the first Web Socket connection and the second Web Socket connection are different.

In a fourth implementation, alone or in combination with one or more of the first through third implementations, process 600 may include determining that the first instance is not installed on the second device after receiving the request, transmitting, to the second device and after determining that the first instance is not installed, a message that includes a link to download the first instance, and receiving, after transmitting the link and prior to activating the first instance, another indication from the second device that the second device has downloaded and installed the first instance.

In a fifth implementation, alone or in combination with one or more of the first through fourth implementations, process 600 may include capturing, via the third device, a recording of the indication provided for display via the second user interface or the information that identifies another set of interactions with the second user interface by another user of the third device, performing, after capturing the recording, an analysis of the recording or multiple recordings, and performing, after performing the analysis, one or more actions related to a result of the analysis.

In a sixth implementation, alone or in combination with one or more of the first through fifth implementations, process 600 may include processing, after receiving the information, the information that identifies the set of interactions using a machine learning model, determining that a subset of the information contains sensitive information based on a result of processing the information using the machine learning model, and, when determining the set of instructions, determining the set of instructions based on one or more other subsets of the information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
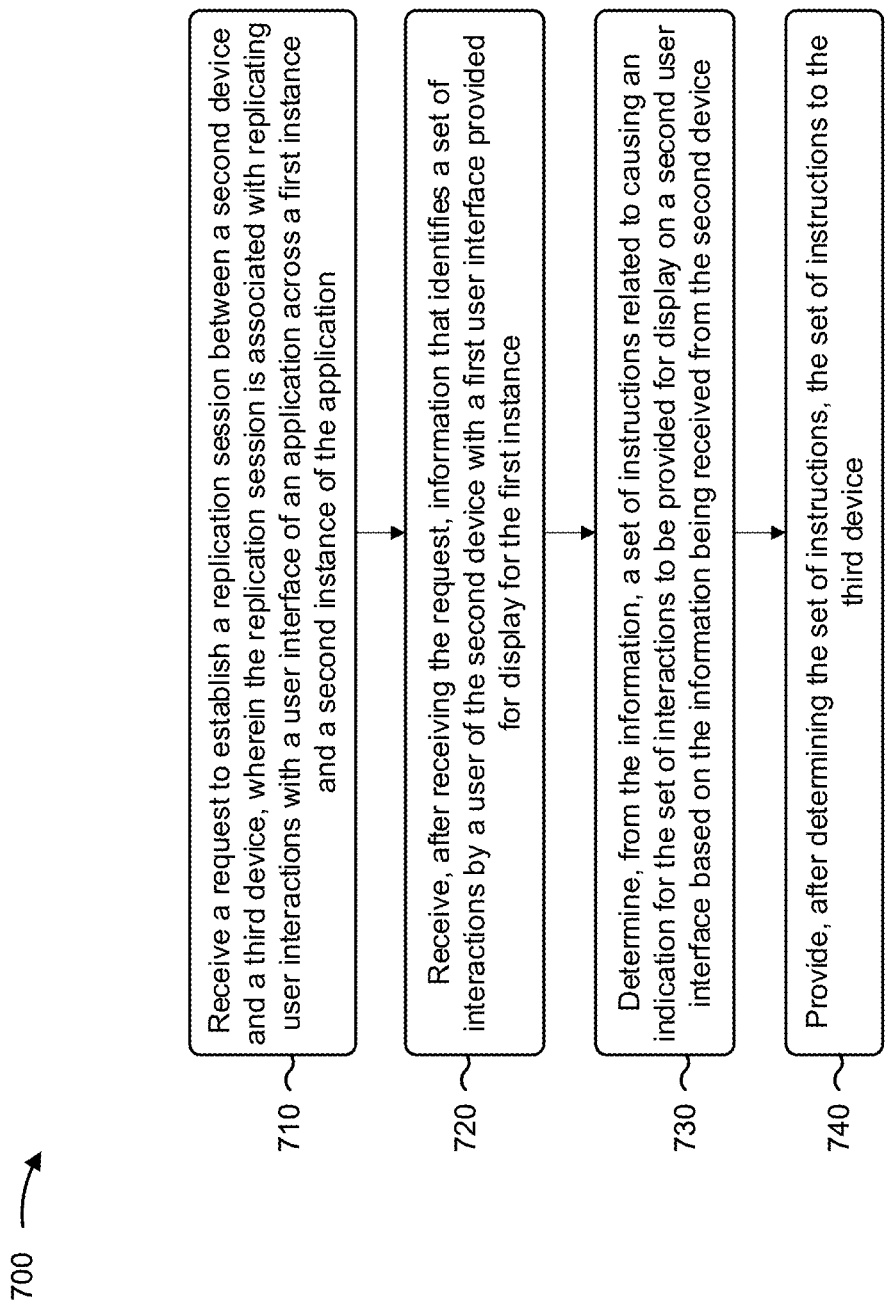
FIG. 7 is a flow chart of an example process for application replication.

FIG. 7 is a flow chart of an example process 700 for replicating user interactions with a user interface of an application across a first instance and a second instance of the application. In some implementations, one or more process blocks of FIG. 7 may be performed by a first device (e.g., application replication platform 340). In some implementations, one or more process blocks of FIG. 7 may be performed by another device or a group of devices separate from or including the application replication platform, such as a user device (e.g., user device 310), a client device (e.g., client device 320), an IVR system (e.g., IVR system 330), and/or the like.

As shown in FIG. 7, process 700 may include receiving a request to establish a replication session between a second device and a third device, wherein the replication session is associated with replicating user interactions with a user interface of an application across a first instance and a second instance of the application (block 710). For example, the first device (e.g., using computing resource 345, processor 420, memory 430, storage component4340, input component 450, output component 460, communication interface 470 and/or the like) may receive a request to establish a replication session between a second device and a third device, as described above. In some implementations, the replication session is associated with replicating user interactions with a user interface of an application across a first instance and a second instance of the application.

As further shown in FIG. 7, process 700 may include receiving, after receiving the request, information that identifies a set of interactions by a user of the second device with a first user interface provided for display for the first instance (block 720). For example, the first device (e.g., using computing resource 345, processor 420, memory 430, storage component4340, input component 450, output component 460, communication interface 470 and/or the like) may receive, after receiving the request, information that identifies a set of interactions by a user of the second device with a first user interface provided for display for the first instance, as described above.

As further shown in FIG. 7, process 700 may include determining, from the information, a set of instructions related to causing an indication for the set of interactions to be provided for display on a second user interface based on the information being received from the second device (block 730). For example, the first device (e.g., using computing resource 345, processor 420, memory 430, storage component4340, input component 450, output component 460, communication interface 470 and/or the like) may determine, from the information, a set of instructions related to causing an indication for the set of interactions to be provided for display on a second user interface based on the information being received from the second device, as described above.

As further shown in FIG. 7, process 700 may include providing, after determining the set of instructions, the set of instructions to the third device (block 740). For example, the first device (e.g., using computing resource 345, processor 420, memory 430, storage component4340, input component 450, output component 460, communication interface 470 and/or the like) may provide, after determining the set of instructions, the set of instructions to the third device, as described above.

Process 700 may include additional implementations, such as any single implementation or any combination of implementations described below and/or in connection with one or more other processes described elsewhere herein.

In a first implementation, the set of instructions are to cause one or more visual indicators to be provided for display on the second user interface based on a selection of a user interface element on the first user interface, cause a change from the second user interface provided for display for the second instance based on a corresponding change from the first user interface provided for display for the first instance, or cause modified text to be provided for display on the second user interface based on input of text into the first user interface.

In a second implementation, alone or in combination with the first implementation, process 700 may include accessing, based on the application, a mapping between a first set of user interface elements of the first user interface and a second set of user interface elements of the second user interface, wherein the mapping identifies corresponding user interface elements of user interfaces of the first instance and the second instance, and, when determining the set of instructions, determining, after accessing the mapping, the set of instructions based on the mapping.

In a third implementation, alone or in combination with one or more of the first and second implementations, process 700 may include sending a first set of instructions to the second device to cause the first instance to be opened on the second device, identifying, after sending the first set of instructions, one or more characteristics of the first instance, identifying the second instance to be opened on the third device based on the one or more characteristics, and sending a second set of instructions to the third device to cause the second instance to be opened on the third device.

In a fourth implementation, alone or in combination with one or more of the first through third implementations, process 700 may include determining that the first instance of the application is not installed on the second device after receiving the request, wherein the request is received from the third device, and causing, after determining that the first instance of the application is not installed on the second device, the second device to download and install the first instance of the application.

In a fifth implementation, alone or in combination with one or more of the first through fourth implementations, process 700 may include processing, after receiving the information, the information that identifies the set of interactions using a machine learning model, wherein the machine learning model has been trained on a training set of data to identify sensitive information, determining, based on a result of processing the information, that the information includes sensitive information, and, when determining the set of instructions, determining, after determining that the information includes the sensitive information, the set of instructions based on a subset of the information that does not include the sensitive information.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by an application replication device and based on receiving a request to establish a replication session between a user device and a client device, information identifying an interaction with a first user interface, of an application, associated with the user device;
accessing, by the application replication device and based on receiving the information identifying the interaction, a mapping between one or more first user interface elements, of the first user interface, and one or more second user interface elements of a second user interface, of the application, associated with the client device;
determining, by the application replication device and based on accessing the mapping, instructions related to an indicator, associated with the interaction, being displayed on the second user interface; and
providing, by the application replication device, the instructions, related to the indicator, to the client device.

2. The method of claim 1, further comprising:
providing, to the client device, instructions related to activating an instance of the application,
wherein receiving the information identifying the interaction is based on providing the instructions related to activating the instance.

3. The method of claim 2, further comprising:
identifying one or more characteristics of the instance of the application; and
determining, based on identifying the one or more characteristics, the instance of the application,
wherein providing the instructions related to activating the instance of the application is based on determining the instance of the application.

4. The method of claim 1, wherein the mapping accounts for a difference between a first instance, of the application on the user device, and a second instance, different from the first instance, of the application on the client device.

5. The method of claim 1, further comprising:
providing, to the client device, instructions related to activating the second user interface of the application,
wherein receiving the information identifying the interaction is based on providing the instructions related to activating the second user interface.

6. The method of claim 1, wherein the information includes one or more of:
information identifying a particular first user interface element of the first user interface elements,
information identifying at least one of a location or a recording of a user interaction with the first user interface, or
information identifying a response of the application to the user interaction.

7. The method of claim 1, further comprising:
determining whether the information identifying the interaction contains sensitive information,
wherein determining the instructions related to the indicator is based on determining whether the information identifying the interaction contains the sensitive information.

8. An application replication device, comprising:
one or more memories; and
one or more processors, coupled to the one or more memories, configured to:
receive, based on receiving a request to establish a replication session between a user device and a client device, information identifying an interaction with a first user interface, of an application, associated with the user device;

access, based on receiving the information identifying the interaction, a mapping between first user interface elements, of the first user interface, and second user interface elements of a second user interface, of the application, associated with the client device;

determine, based on accessing the mapping, instructions related to an indicator, associated with the interaction, being displayed on the second user interface; and provide the instructions, related to the indicator, to the client device.

9. The application replication device of claim 8, wherein the mapping is based on a coordinate mapping system.

10. The application replication device of claim 9, wherein the mapping identifies a first coordinate point on the first user interface and a second coordinate point, different from the first coordinate point, on the second user interface.

11. The application replication device of claim 8, wherein the indicator is at least one of:
a highlighted portion of the second user interface,
an arrow pointing to a particular portion of the second user interface,
a flashing portion of the second user interface,
a pulsing portion of the second user interface,
at least one of a circle or an oval surrounding the particular portion of the second user interface, or
a graphical overlay demonstrating a manner of the interaction with the first user interface.

12. The application replication device of claim 8, wherein the one or more processors are further configured to:
receive, from the client device and based on providing the instructions related to the indicator, information identifying a second interaction with the second user interface of the application.

13. The application replication device of claim 12, wherein the one or more processors are further configured to:
perform, based on receiving the information identifying the second interaction with the second user interface, an outcome related to the request.

14. The application replication device of claim 13, wherein the outcome is one or more of:
a score,
a report,
a recommendation,
an employment contract, or
a reporting to an entity.

15. The application replication device of claim 12, wherein the one or more processors are further configured to:
determine, based on receiving the information identifying the interaction with the second user interface, instructions related to a second indicator being displayed on the first user interface.

16. The application replication device of claim 15, wherein the one or more processors are further configured to:
provide, to the user device, instructions related to the second indicator.

17. A non-transitory computer-readable medium storing a set of instructions, the set of instructions comprising:
one or more instructions that, when executed by one or more processors of an application replication device, cause the application replication device to:
receive, based on receiving a request to establish a replication session between a user device and a client device, information identifying an interaction with a first user interface, of the application, associated with the user device;

access, based on receiving the information identifying the interaction, a mapping between first user interface elements, of the first user interface, and second user interface elements of a second user interface, of the application, associated with the client device;

determine, based on accessing the mapping, instructions related to an indicator, associated with the interaction, being displayed on the second user interface; and provide instructions, related to the indicator, to the client device.

18. The non-transitory computer-readable medium of claim 17, wherein the mapping accounts for a difference between a first instance, of the application on the user device, and a second instance, different from the first instance, of the application on the client device.

19. The non-transitory computer-readable medium of claim 17, wherein the mapping is based on a coordinate mapping system.

20. The non-transitory computer-readable medium of claim 19, wherein the mapping identifies a first coordinate point on the first user interface and a second coordinate point, different from the first coordinate point, on the second user interface.

* * * * *